March 5, 1957

R. B. LAWRANCE ET AL 2,784,373

HIGH-VACUUM DEVICE

Filed March 2, 1953

*INVENTORS*
RICHARD B. LAWRANCE
JONATHAN R. ROEHRIG

BY

Oliver W. Hayes

ATTORNEY

United States Patent Office 2,784,373
Patented Mar. 5, 1957

2,784,373

HIGH-VACUUM DEVICE

Richard B. Lawrance, Cambridge, and Jonathan R. Roehrig, Newton Lower Falls, Mass., assignors to National Research Corporation, Cambridge, Mass., a corporation of Massachusetts Application March 2, 1953, Serial No. 339,608

4 Claims. (Cl. 324—33)

The present invention is primarily concerned with leak detectors, and particularly leak detectors for checking the tightness of hollow objects, such as tin cans, radio tubes and the like.

A principal object of the present invention is to provide an improved leak detector which is arranged to operate rapidly and to give an accurate indication of the presence of a leak.

Another object of the present invention is to provide a leak detector of the above type, particularly wherein the object whose tightness is to be tested is arranged to be subjected to a vacuum and a vacuum gauge is employed to determine the presence of a leak.

Still another object of the present invention is to provide a leak detector of the above type which can operate a control circuit for rejecting the tested object in the event that a leak is indicated.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
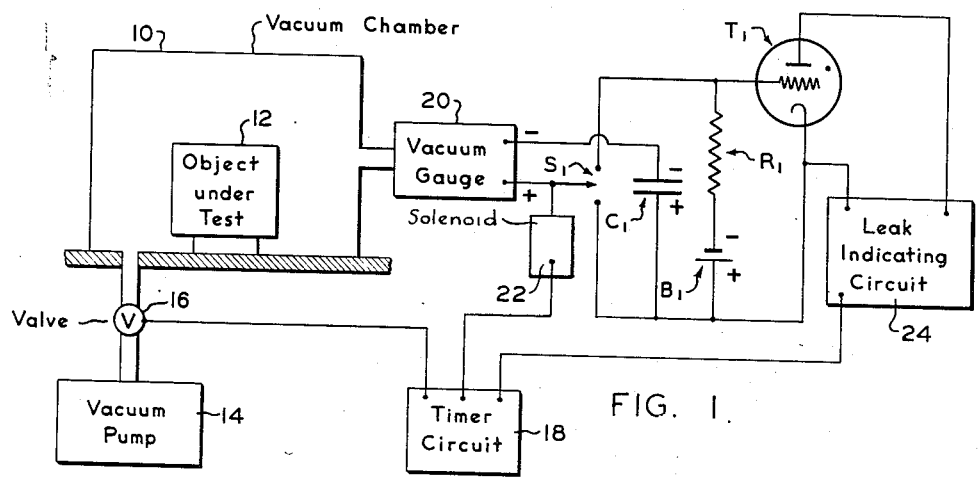
Figure 2:
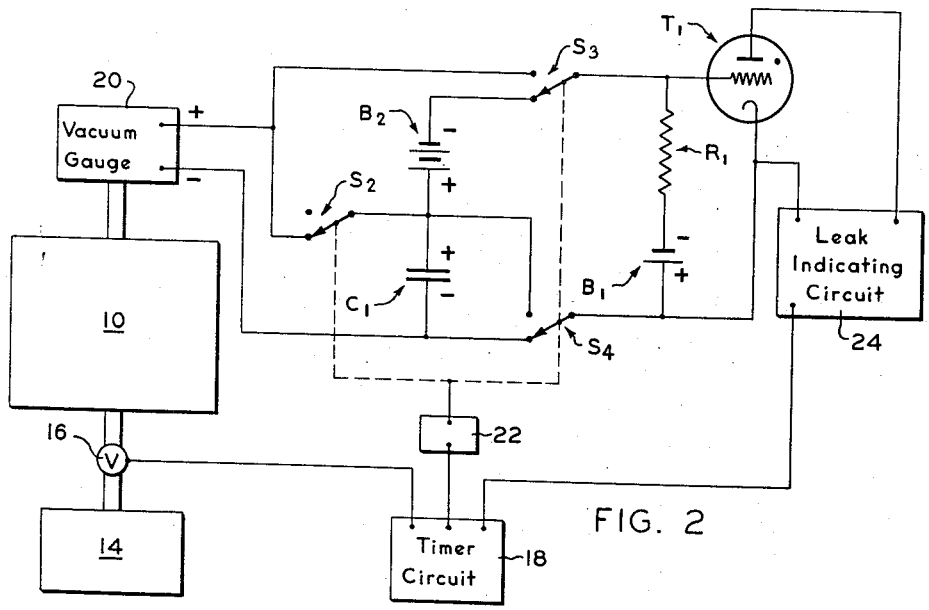

For a fuller understanding of the nature and objects of the invention, reference should be had to the following detailed description taken in connection with the accompanying drawing wherein:

Fig. 1 is a diagrammatic, schematic embodiment of one form of the invention; and Fig. 2 is a schematic, diagrammatic embodiment of an alternative form of the invention.

As indicated previously, the present invention is primarily concerned with the detection of leaks in walls of hollow objects and the like. Leak detection is extremely important in connection with the testing of components of vacuum systems or containers which are to be either evacuated or to hold a gas under pressure. One example of such an object is a tin can which is to store a food product either under a positive or negative pressure. The present invention is particularly appropriate for testing tin cans after the can has been finally sealed. This is particularly true if it is a pressurized can and a space around the can is evacuated to achieve a large pressure drop across the wall of the can.

As briefly mentioned above, a preferred embodiment of the present invention comprises a means for creating a pressure difference on the two sides of a wall (of a tin can for example) whose tightness is to be tested. This pressure difference is preferably obtained by evacuating the air from one side of the wall.

For simplicity, the invention will be initially described in connection with the test of a pressurized can whose tightness is to be tested. Such a can usually has an internal pressure slightly in excess of 1 atmosphere absolute of a relatively inert gas such as nitrogen or carbon dioxide, when food products are stored in the can. This can may be placed in a vacuum chamber which can be evacuated after insertion of the can. In the operation of the present invention the chamber is evacuated for a few seconds to obtain a relatively good vacuum on the order of a tenth of an mm. Hg abs. to a few mm. Hg abs. The vacuum chamber is then isolated from the vacuum pumping system and the pressure in the system is read by a suitable vacuum gauge. In a preferred embodiment of the invention this vacuum gauge is of the type described in U. S. Patent No. 2,497,213 to Downing. This Downing gauge has the distinct advantage that it can operate at pressures as high as atmospheric without endangering the operability of the gauge. The Downing gauge also has the desirable characteristic of a very rapid response to changes in pressure.

The pressure read by the Downing gauge will give an output voltage, from the gauge amplifier circuit, which is a function of the absolute pressure in the vacuum chamber. In the present invention this output voltage is utilized to charge a capacitor. The vacuum system is then allowed to remain at rest for a short period of time (on the order of a second or two) and the pressure is again read with the same gauge. If the pressure has risen, the output voltage of the pressure gauge will be correspondingly higher. This voltage is then compared with the voltage previously applied to the capacitor. If the difference between these two voltages exceeds a predetermined amount, this difference is adequate to trip a leak indicating circuit.

In a preferred embodiment this leak indicating circuit comprises a thyratron which is normally biased slightly negative. If the difference between the original voltage applied to the capacitor and the voltage corresponding to the second reading exceeds this bias (or a predetermined portion thereof) the thyratron will fire. Since the thyratron has a relatively large plate current, this plate current can be utilized for actuating numerous different types of leak indicating mechanisms. In a continuous can testing line, for example, the output of the thyratron may be utilized to swing a gate across the can line to reject the can in which a leak has been detected.

Referring now to Fig. 1 there is shown one embodiment of the invention which, for simplicity, is illustrated as being arranged to test the tightness of a sealed container (such as a tin can) which has therein a gas under a slight superatmospheric pressure. The apparatus of Fig. 1 includes a vacuum chamber 10 in which a can 12 to be tested may be positioned. For evacuating the chamber 10 there is provided a vacuum pump 14 which, in a preferred embodiment, comprises a standard mechanical vacuum pump. Between the vacuum pump 14 and the chamber 10 there is provided a valve 16, preferably electrically or pneumatically operated, for isolating the chamber 10 from the pumping system at a predetermined time in the cycle of operation of the device. The closing of this valve 16 is preferably controlled by a timer circuit 18 which may be a clock motor operating a plurality of electrical or pneumatic switches. A vacuum gauge 20 is preferably included for reading the pressure in the vacuum chamber. For convenience, this vacuum gauge 20 is preferably of the type described in the above mentioned U. S. patent to Downing. In the output circuit of the vacuum gauge 20 there is arranged a switch $S_1$. The operation of this switch is controlled by a mechanism such as a solenoid 22. In one position of the switch $S_1$ a capacitor $C_1$ may be charged by the output voltage of the vacuum gauge 20. The leak testing circuit also includes a thyratron $T_1$, an isolating resistor $R_1$, and a biasing battery $B_1$. The output of the thyratron $T_1$ is preferably connected to a leak indicating circuit 24.

In the operation of the apparatus shown in Fig. 1, a can 12 to be tested is placed in the vacuum chamber 10. The timer circuit 18 then opens the valve 16 to allow the vacuum pump to evacuate the vacuum chamber 10 for a period of perhaps three seconds. At the end of the three-second period, the timer circuit closes the valve 16 and energizes the solenoid 22 so that the switch $S_1$ is moved downwardly. This places the output of the vacuum gauge directly across the capacitor $C_1$ so as to charge the capacitor $C_1$ to a voltage equal to the output voltage of the vacuum gauge 20. The application of this voltage lasts for only a moment and the switch $S_1$ is almost immediately opened. In this connection it should be pointed out that the vacuum gauge 20 preferably has a low impedance output so as to provide rapid charging of the capacitor $C_1$ to its equilibrium state within the short time that the switch $S_1$ is closed. This low impedance thus also provides for rapid discharge of the capacitor $C_1$ if its charge is above the instantaneous output voltage of the gauge 20, as might be the case if a preceding can, in a can line, has been faulty. Approximately one second later the timer circuit operates on the solenoid 22 so as to move the switch $S_1$ upwardly. This places the capacitor $C_1$ and the output of the vacuum gauge 20 in series, but with the two charges opposing each other. If no pressure rise has taken place, the bias on the grid of the thyratron $T_1$ (due to the battery $B_1$) will prevent the thyratron from firing. However, if the pressure in the vacuum chamber 10 has risen, due to the presence of a leak in the can 12, the vacuum gauge 20 will read a higher pressure and, accordingly, will have a higher output voltage. If the pressure in the system has risen as much as 100 microns Hg abs., for example, the increased output voltage of the vacuum gauge 20 will be sufficient to overcome the negative bias of the battery $B_1$ and thereby cause the tube $T_1$ to fire.

As will be apparent, by properly correlating the output voltage of the vacuum gauge 20 and the bias of the battery $B_1$, the thyratron $T_1$ may be made to fire whenever the pressure in the vacuum chamber 10 rises by any predetermined incremental amount.

One particular advantage of the system illustrated above is the fact that a zero setting of the vacuum gauge 20 is unnecessary. Equally unnecessary is the obtaining of any particular value of low pressure during the evacuation of the vacuum chamber 10. This is due to the fact that, as long as the vacuum gauge 20 is operating in a range where the relationship between the pressure being measured and the output voltage is approximately linear, the value of the first reading is of no particular consequence. It can, for example, give an output voltage of 5 volts, 6 volts, or 7 volts. The second reading made by the vacuum gauge will then give a voltage which is higher than the original voltage by the amount due to the incremental pressure rise between the time of the first reading and the second reading. The difference between the first voltage and the second voltage represents this increment of pressure rise. When the incremental voltage is more than a predetermined amount, it overcomes the bias $B_1$ and causes the tube $T_1$ to fire.

Referring now to Fig. 2 there is shown another embodiment of the invention wherein like numbers refer to like elements in the preceding figure. In the Fig. 2 arrangement, the electrical circuit is designed so that, if a predetermined low pressure has not been attained after a definite amount of pump down time, the circuit will indicate a leak. The circuit is also arranged so that a predetermined incremental pressure rise after isolation of the pumping system from the vacuum chamber will cause an indication of a leak. In the arrangement of Fig. 2 the switch $S_1$ of Fig. 1 has been replaced by three switches $S_2$, $S_3$, and $S_4$. Additionally, a battery $B_2$ has been placed so as to be initially in series with the capacitor $C_1$.

In the operation of the device of Fig. 2, the timer circuit causes the valve 16 to open at the start of the cycle. At the end of three seconds, the valve 16 is closed and switches $S_2$, $S_3$ and $S_4$ are momentarily moved to the down position by means of the solenoid 22. At this moment the output of the vacuum gauge 20 is applied to the capacitor $C_1$. If the voltage across the capacitor $C_1$ exceeds the bias of the battery $B_2$ by an amount sufficient to overcome the grid bias $B_1$ of the thyratron $T_1$, the thyratron will fire to indicate a leak. If, however, at this instant of time the pressure in the vacuum chamber 10 is less than a predetermined amount, the charge on the capacitor $C_1$ will not be sufficient to overcome the voltage $B_2$. At an interval of about one second later, switches $S_2$, $S_3$ and $S_4$ are moved to the upward position. At this point the output of the vacuum gauge 20 is in series with the charge previously placed on the capacitor $C_1$. If the pressure in the vacuum chamber 10 has not risen appreciably, the output voltage of the vacuum gauge 20 will not overcome the negative bias on the thyratron $T_1$. However, if the object under test has been leaking, the pressure in chamber 10 will have risen sufficiently so that the output of the vacuum gauge 20 will be considerably greater than the voltage previously placed on the capacitor $C_1$ and the thyratron $T_1$ will fire.

In both of the above circuits, it is preferred that the timer 18 control the leak indicating circuit so that the thyratron plate circuit is opened at time zero, thereby resetting the thyratron so that it may be again fired if the next can to be tested is faulty. The same result can be achieved by using an A. C. plate voltage for the thyratron.

While one preferred embodiment of the invention has been described above, it should be readily apparent that numerous alternative embodiments can be employed without departing from the scope of the invention. For example, an Eccles-Jordan "flip-flop" circuit may be employed so as to eliminate the necessity for the polarity reversing switches $S_2$, $S_3$, and $S_4$. Numerous other measuring techniques well known to those skilled in the art may equally be employed in the present invention.

While one specific arrangement of the invention has been described above, it may be utilized for testing numerous other objects such as cathode ray tubes, vacuum tubes, components of vacuum systems and the like. While the Downing gauge is particularly suited for use in this invention, other gauges may be employed when such other gauges are sufficiently fast in response and can operate over a satisfactorily wide range of pressures.

Since certain changes may be made in the above apparatus without departing from the scope of the invention herein involved, it is intended that all matter contained in the above description, or shown in the accompanying drawing, should be interpreted as illustrative and not in a limiting sense.

What is claimed is:

1. A leak detector comprising means for creating a pressure difference on two sides of a wall whose tightness is to be tested, means for measuring the pressure on one side of said wall, a capacitor arranged to be charged by the pressure-measuring means to a voltage which is a function of the measured pressure, means for comparing the voltage on the capacitor with a voltage obtained by a second pressure reading made at a later instant of time, and means operatively associated with the voltage comparing means and responsive to a predetermined voltage difference for indicating a leak when the difference between said voltages exceeds a predetermined amount.

2. A leak detector comprising means for evacuating the air from one side of a wall whose tightness is to be tested, a vacuum gauge for measuring the degree of vacuum obtained, a capacitor arranged to be charged by the vacuum gauge to a voltage which is a function of the measured vacuum, means for comparing the voltage on the capacitor with a voltage obtained by a second pressure reading made at a later instant of time, and means operatively associated with the voltage comparing means and responsive to a predetermined voltage difference for indicating a leak when the difference between said voltages exceeds a predetermined amount.

3. A leak detector comprising means for evacuating the air from one side of a wall whose tightness is to be tested, a vacuum gauge for measuring the degree of vacuum obtained, a capacitor arranged to be charged by the vacuum gauge to a voltage which is a function of the measured vacuum, an electronic tube having a predetermined bias voltage rendering said tube inactive, a leak indicator controlled by said electronic tube, and means for applying the difference between said bias and capacitor voltages to said electronic tube to render said tube active so that the leak indicator will indicate the presence of a leak.

4. A leak detector comprising means for evacuating the air from one side of a wall whose tightness is to be tested, a vacuum gauge for measuring the degree of vacuum obtained, a capacitor arranged to be charged by the vacuum gauge to a voltage which is a function of the measured vacuum, an electronic tube having a predetermined bias voltage rendering said tube inactive, a leak indicator controlled by said tube, a timer circuit and switch mechanism for connecting said gauge output with said predetermined bias voltage to overcome said bias so that said tube will operate said leak indicator to indicate the presence of a leak if a predetermined low pressure has not been obtained in the vacuum chamber, said timer circuit and switch mechanism also connecting said gauge output to said capacitor to charge said capacitor and later in the timing cycle to compare the capacitor charge with a later vacuum gauge output.

References Cited in the file of this patent

UNITED STATES PATENTS

| | | |
|---|---|---|
| 2,526,038 | Nelson | Oct. 17, 1950 |
| 2,560,952 | Herold | July 17, 1951 |
| 2,567,215 | Lacks | Sept. 11, 1951 |
| 2,707,249 | Schneider | Apr. 26, 1955 |